US011199862B2

(12) United States Patent
Sadzakovic

(10) Patent No.: US 11,199,862 B2
(45) Date of Patent: Dec. 14, 2021

(54) AXIAL GAS PRESSURE REGULATOR

(71) Applicant: Gas Teh Ltd., Indjija (RS)

(72) Inventor: Miroljub Sadzakovic, Novi Beograd (RS)

( * ) Notice: Subject to any disclaimer, the term of this patent is extended or adjusted under 35 U.S.C. 154(b) by 231 days.

(21) Appl. No.: 16/469,588

(22) PCT Filed: Dec. 22, 2017

(86) PCT No.: PCT/RS2017/000018
§ 371 (c)(1),
(2) Date: Jun. 13, 2019

(87) PCT Pub. No.: WO2018/124907
PCT Pub. Date: Jul. 5, 2018

(65) Prior Publication Data
US 2019/0384332 A1    Dec. 19, 2019

(30) Foreign Application Priority Data
Dec. 29, 2016   (RS) .................................. P-2016/1198

(51) Int. Cl.
*G05D 16/16*       (2006.01)
*G05D 16/06*       (2006.01)
*F16K 31/365*     (2006.01)

(52) U.S. Cl.
CPC ....... *G05D 16/163* (2013.01); *G05D 16/0686* (2013.01); *F16K 31/365* (2013.01)

(58) Field of Classification Search
CPC ......... Y10T 137/7831; Y10T 137/3421; Y10T 137/777; G05D 16/163; G05D 16/0686;
(Continued)

(56) References Cited

U.S. PATENT DOCUMENTS 1,058,102 A  *  4/1913  Ricketss ............ G05D 16/0683
                                                     137/505.47
1,520,474 A  *  12/1924  Larner .................... F16K 1/126
                                                        137/220
(Continued)

FOREIGN PATENT DOCUMENTS

FR          1 561 353 A        3/1969
FR            1561353 A   *   3/1969   ......... G05D 16/0688

*Primary Examiner* — Jessica Cahill
(74) *Attorney, Agent, or Firm* — Seed Intellectual Property Law Group LLP

(57) ABSTRACT

Axial gas pressure regulator in which in a housing (01) is axially positioned a balanced nozzle (02), slidingly movably placed in sliding gaskets (23). Nozzle (02) is pressed by spring (10) and extension (03), while a seat (05) with a gasket (07) is mounted opposite to it, which is squeezed between the housing (01) and an outlet flange (04) and in which are performed openings (29). On the upper side of the housing (01) is mounted a carrier (30) of a second housing (21), consisting of a lower part (08) and an upper part (09), between which is squeezed a membrane (22). On the upper and lower side of membrane (22) is placed on each side one plate (33) which are in the central part connected by a support (34) and a tightener (35), and in the center of which the piston (12) is fixed with a performed choking channel (11) in the axis. The piston (12) is by its lower end slidingly movably placed, through a guide (36) and gaskets (24), in lower part (08) of the second housing (21), and by the upper end, through a guide (37) and gaskets (24), it is placed in the upper part (09) of the second housing (21). The piston (12) leans on roller (13) which is by an axle (17) rotatably placed at the end of a first lever (14), which is by its other end articulately connected with a support (30), and by its middle is articulately connected to a second lever (15). The second lever (15) is at its lower end articulately connected to a third lever (16), which is by an axle (18) is slidingly movably (Continued)

placed in the lower part of the carrier (30), while archly bended legs (161) of the third lever (16) comprise the nozzle (02) and, via plates (38), are slidingly movably connected to it.

3 Claims, 4 Drawing Sheets

(58) Field of Classification Search
CPC ....... G05D 16/02; F16K 31/365; F16K 47/02; F16L 55/02
See application file for complete search history.

(56) References Cited

U.S. PATENT DOCUMENTS

| | | | | |
|---|---|---|---|---|
| 2,012,957 A * | 9/1935 | Cleveland | ............ | G05D 16/163 |
| | | | | 137/484.2 |
| 2,042,781 A * | 6/1936 | Grove | ................... | G05D 16/163 |
| | | | | 137/489 |
| 2,624,980 A * | 1/1953 | Hughes | ................ | G05D 16/163 |
| | | | | 137/492.5 |
| 2,664,672 A * | 1/1954 | Ey | ....................... | G05D 16/0688 |
| | | | | 137/251.1 |
| 3,456,674 A * | 7/1969 | Buresh | ............... | G05D 16/0608 |
| | | | | 137/220 |
| 4,069,839 A * | 1/1978 | Hughes | .............. | G05D 16/0686 |
| | | | | 137/505.46 |
| 10,168,717 B2 * | 1/2019 | Lin | .................... | G05D 16/0688 |
| 10,428,971 B1 * | 10/2019 | DeFelice | ................. | F01D 17/08 |
| 10,823,087 B1 * | 11/2020 | DeFelice | ................... | F16K 1/12 |

\* cited by examiner

AXIAL GAS PRESSURE REGULATOR

TECHNICAL FIELD

The invention belongs to the field of mechanical engineering technique, or gas technology, more precisely the field of regulating equipment for natural gas, propane-butane and, other technical gases.

According to the International Patent Classification, the invention is classified in class G 05 D 16/06, which defines regulation of fluid pressure without auxiliary energy, with a sensitive element which is subject to pressure as an elastic element, e.g. diaphragm, bellows, capsule. The invention may also be classified in class F 16 L 55/02 defining devices or accessories for use with or in connection with tubes or tube energy absorption systems. The invention is even more precisely classified as F 16 K 47/02, which refers to means of energy fluid absorption valves.

TECHNICAL PROBLEM

The technical problem solved by the present invention consists in how to resolve an axial regulator of gas pressure of indirect acting in a constructive way, in order to enable, by applying a regulator housing in which is slidingly movably placed a nozzle and opposite of it is in a fixed way placed a shutter on the side of the outlet pressure, and a housing of membrane assembly in which a membrane is mounted on a sliding movable central piston coupled on the lower side with a lever mechanism whose lower lever is rotatably coupled to the movable nozzle and in which housing is fitted an indicator of pressure increase, a constant value of output pressure within the regulating group, independently from change in the inlet pressure, with increased gas flow coefficient, and to facilitate servicing of the membrane and elements of its assembly and lever mechanism, and to detect damages of main sliding gasket elements and their servicing, all this without removing the regulator from the line, in which case it remains closed.

BACKGROUND ART

Applicants of this application have knowledge of pressure regulator solutions of the following manufacturers:
1. Tartarini (Italy)-Series FL
2. Heat-Megaflow-MF
3. Fisher (now "Emerson"-USA)-Type 310A
4. RMG (Germany)-Type 512

Regulators of manufacturers Tartarini, Heat, Fisher and RMG are structurally similar solutions, with Fisher and RMG regulators having a formed long-running membrane. All of these regulators are regulators of indirect acting, in which the membrane assembly is directly coupled with a nozzle. Therefore, it is permitted to move the nozzle in relation to the membrane assembly in a ratio of 1:1, which is a defect of mentioned solutions. In addition, in order to service and replace the membrane, it is necessary to remove the regulator from the line. These regulator solutions do not have a fully balanced nozzle, so additional force of inlet pressure on the nozzle is required to close the regulator, thus preventing better regulation and at the same time reducing flow characteristics.

DISCLOSURE OF INVENTION

The technical problem is successfully solved by the axial regulator of gas pressure of indirect acting. The axial regulator of gas pressure of indirect acting, according to the present invention, is performed of a housing in which a balanced nozzle is mounted axially, slidingly movably placed in sliding gaskets. On the inlet side of the housing, the nozzle is pressed by a spring and an extension of the inlet flange. On the outlet side, a seat with a gasket is placed opposite to the nozzle. The seat is squeezed between the housing and the outlet flange. In the seat there are openings for flow of the working fluid from the nozzle to the outlet flange. The membrane housing holder is mounted on the upper side of the housing. The membrane housing is composed of the lower and upper part. A membrane is squeezed between lower and upper parts. From the top and bottom side of the membrane is placed one plate on each side that is connected in the middle part with a support and a tightener. In the center of the support, a piston is mounted in whose axis a choking chanal is performed which is connected to the space above the membrane and with the space beneath the membrane. The piston is slidingly movably placed in the lower part of the membrane housing, through a guide and gaskets, and by its upper end, through a guide and gaskets, and placed in the upper part of the membrane housing. With its lower forehead, the piston leans onto a roller that is rotatably placed at the end of the first lever of the lever mechanism. The last lever in the lever mechanism is slidingly movably connected with a balanced nozzle. In the membrane housing carrier, on the side of the inlet flange, slindingly movably is placed an axle-indicator of pressure increase and is positioned in the far right position by a spring, while at the other end it is secured by a safety device.

The regulator housing, at gas inlet, is connected via an impulse line with a pre-pilot regulator in conjunction with the pilot regulator (not subject to patent protection). The pilot regulator is connected to the impulse line with the upper part of the membrane housing.

Advantages of this solution of the axial regulator of of gas pressure of indirect acting are that its construction provides a constant value of the exit pressure within the regulation group, regardless of change of inlet pressure, with increased gas flow coefficient. It is facilitated to service the membrane and elements of its assembly and lever mechanism. In addition, the regulator has the ability to detect damages of main sliding gasket elements and their servicing, all stated without removing the regulator from the line.

Moving the balancing nozzle and the membrane is in the ratio 1:1. Thanks to the transferable lever mechanism, by changing dimensions of levers, this ratio can be changed in desired range.

In the case of failure or damage to the membrane, the regulator remains closed.

BRIEF DESCRIPTION OF DRAWINGS

The invention is explained in detail by accompanying drawings in which.

DETAILED DESCRIPTION OF INVENTION

Figure 1:
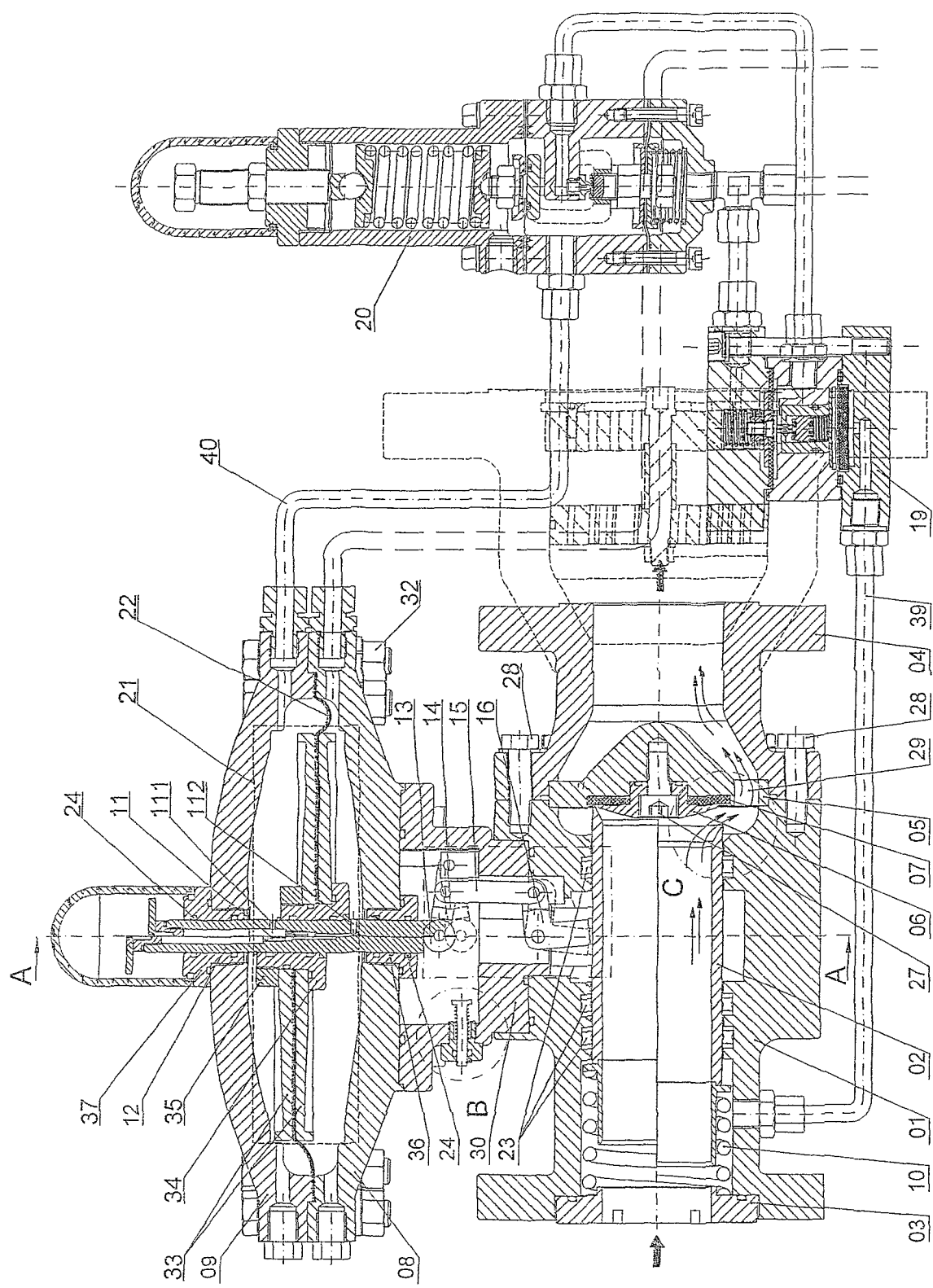
FIG. 1. Displays the vertical cross-section of assembly of the axial regulator of gas pressure of indirect acting together with pilot regulators.
Figure 2:
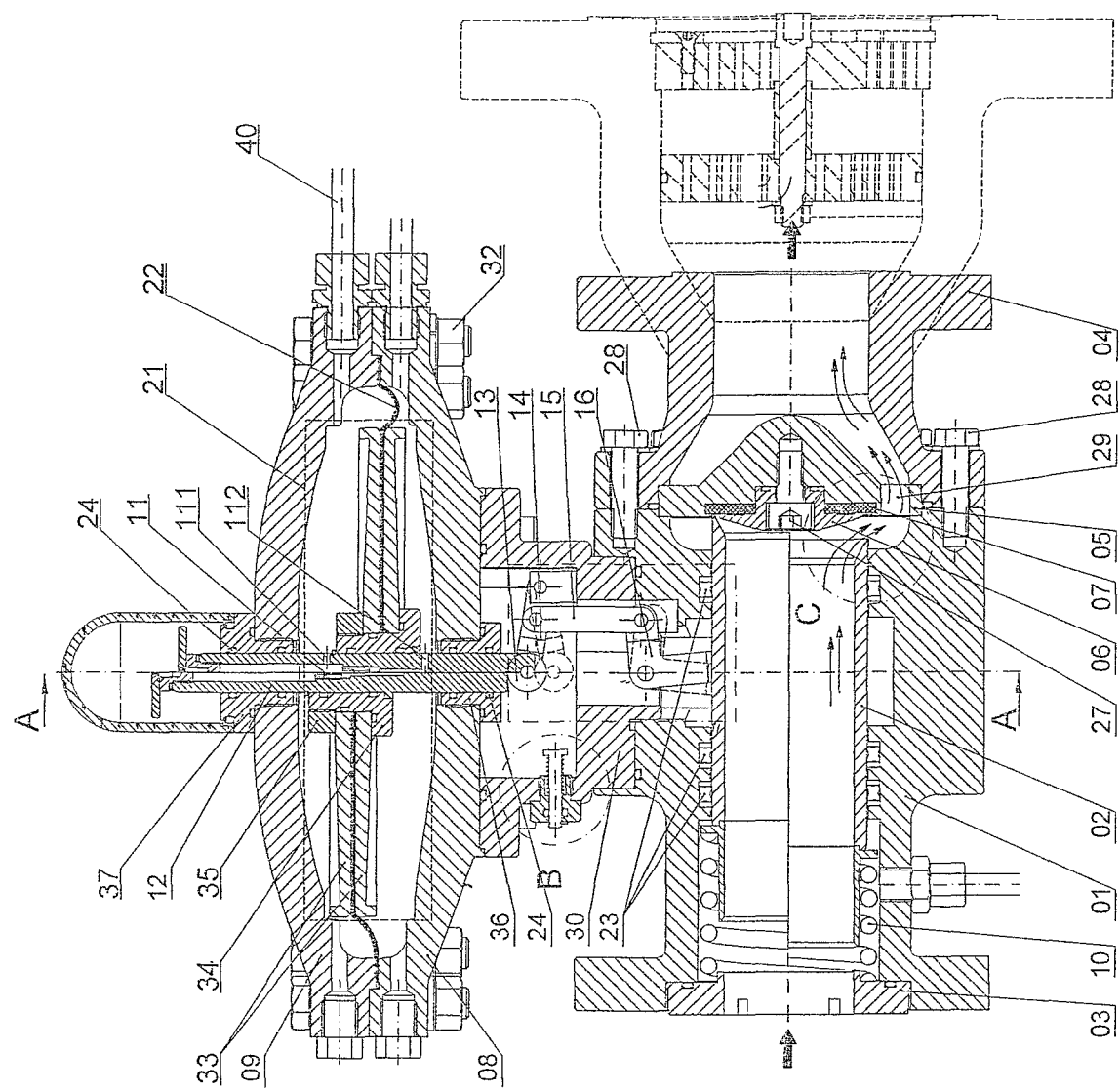
FIG. 2. Displays the vertical cross-section of the axial regulator assembly of FIG. 1.
Figure 3:
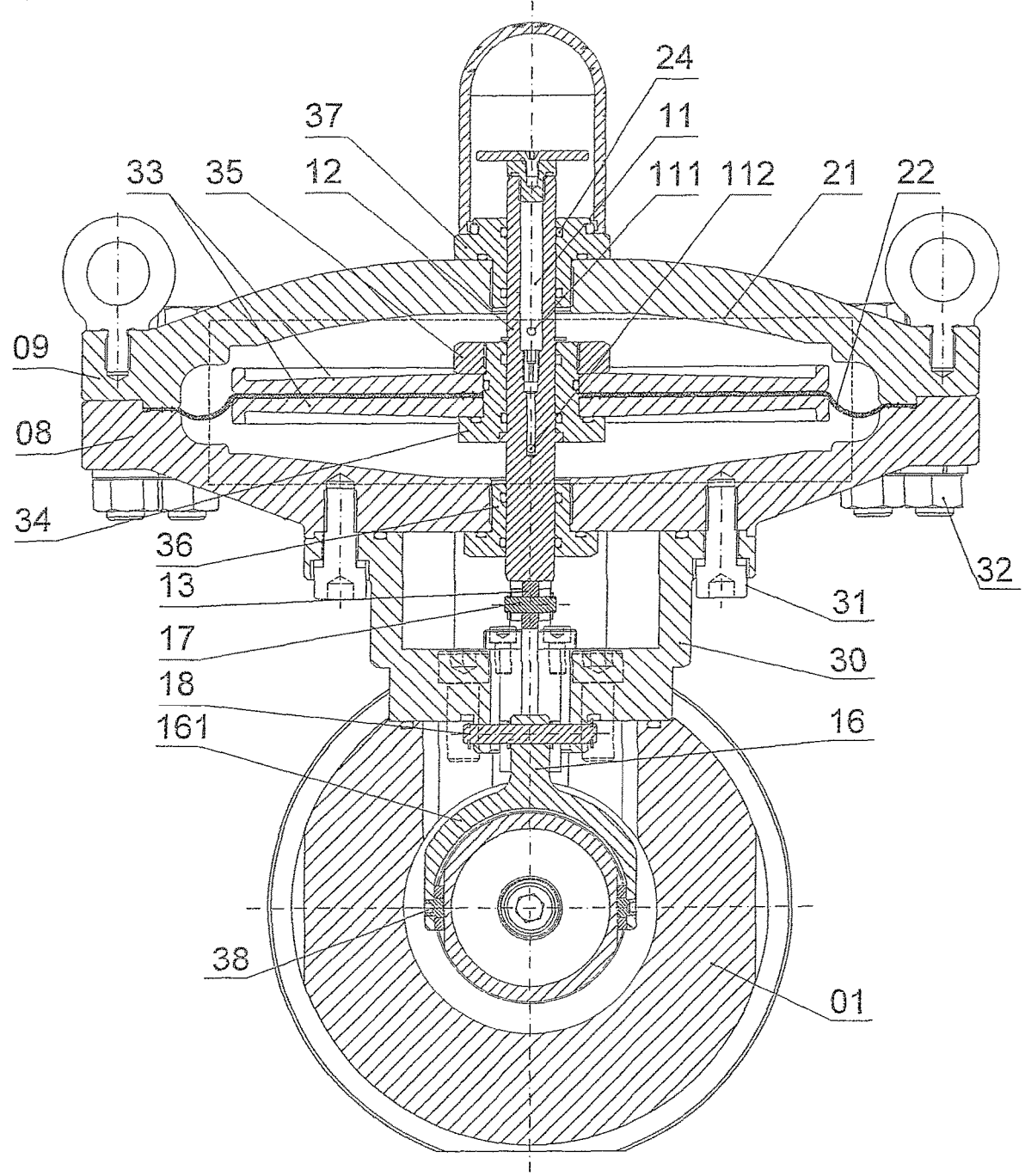
FIG. 3. Displays the cross-section A-A of FIGS. 1 and 2.
Figure 4:
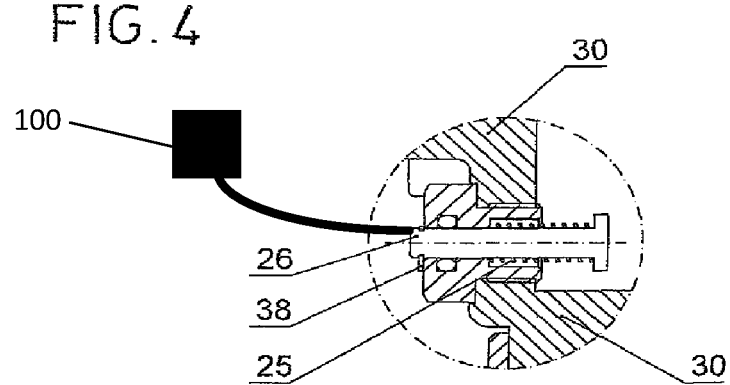
FIG. 4. Displays the detail "B" of FIGS. 1 and 2.
Figure 5:
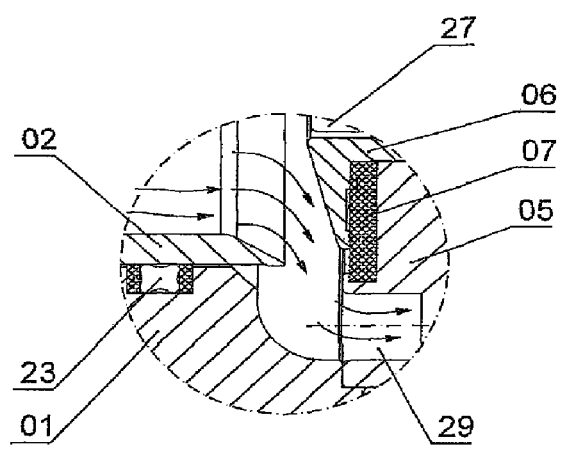
FIG. 5. Displays the detail "C" of FIGS. 1 and 2.

The axial regulator of gas pressure of indirect acting, according to the present invention, is performed of housing

01 in which balanced nozzle 02 is axially positioned, slidingly movably placed in sliding gaskets 23. On the inlet side of housing 01, nozzle 02 is pressed by spring 10 and by extension 03 of inlet flange fixed to housing 01. On the outlet side, seat 05 with gasket 07 is placed opposite of nozzle 02, which gasket is pressed by tightener 06 and fastened by screw 27. Seat 05 is squeezed between housing 01 and outlet flange 04 fastened by screws 28 to housing 01. In seat 05 are performed openings 29 for flow of working fluid from nozzle 02 into outlet flange 04. On the upper side of housing 01 is placed carrier 30 of housing 21 of membrane 22. Housing 21 is comprised of lower part 08 and upper part 09 which are connected by screws 32. Housing 21 is connected to carrier 30 by screws 31. A membrane 22 is squeezed between lower and upper part 08,09 of housing 21. From the upper and lower side of membrane 22, is placed one plate 33 on each side, which are in central part joined by support 34 and tightener 35. In the center of support 34, a piston 12 is mounted in whose axis is performed choking channel 11, which is connected by opening 111 to space above membrane 22 and by opening 112 it is connected to space beneath membrane 22. Piston 12 is by its lower end slidingly movably placed, by guide 36 and gaskets 24, in lower part 08 of housing 21, and in upper end, by guide 37 and gaskets 24, it is placed in upper part 09 of housing 21. With its lower forehead, piston 12 fits onto roller 13, which is by axle 17 pivotally placed at the end of lever 14. Lever 14 is articulately connected by the other end to carrier 30, and by its middle it is articulately connected with a lever 15. Lever 15 is by its lower end is articulately connected with lever 16 which is by axle 18 slidingly movably placed in the lower part of carrier 30. Archly bended legs 161 of lever 16 comprise nozzle 02 and, via plates 38, are slidingly movably connected to it. In carrier 30, on the side of inlet flange 03, slidingly movably is placed axle 26 and it is positioned to the far right position under pressure of spring 25, and, at the other end, is secured by safety device 38.

Housing 01 of the regulator, at gas inlet, is connected via impulse line 39 to pre-pilot regulator 19, that is in conjunction with pilot regulator 20 (not subject to patent protection). Pilot regulator 20 is connected by impulse line 40 with upper part 09 of housing 21 of membrane 22.

The axial regulator of gas pressure of indirect acting, according to the present invention, is a regulator that provides constant value of the output pressure, within the regulation group, independently of change in inlet pressure. In initial state, when there is no gas in the installation, the regulator is in closed position. Then balanced nozzle 02, under force of spring 10, closes seat 05 of the regulator. By inserting gas into the installation, it is via impulse line 39 brought to pre-pilot regulator 19 and pilot regulator 20, in which mutual ratio of its executive bodies is established according to set value of output pressure. On this basis, directing pressure is generated which, by impulse line 40, leads to upper part 09 of housing 21, into the space above membrane 22. The directing pressure through opening 111, choking channel 11 and opening 112 in piston 12 extends into the area beneath membrane 22. Overflow through choking channel 11 causes a pressure drop below membrane 22 for DP". The force caused by pressure difference above and below membrane 22 pushes the membrane assembly, together with piston 12 downwards. Piston 12, through lever mechanism with which it is coupled, drives lever 16 whose arc legs axially shift the balancing nozzle to the left or right and in this way perform controlled opening or closing of the regulator or fine-tuning of flow of the working fluid through the regulator.

INDUSTRIAL APPLICABILITY

The axial regulator of gas pressure of indirect acting is intended for regulating pressure of natural gas, propane butane and other technical gases. The regulator of the present invention is designed for inlet pressures up to 100 bars.

Nominal diameter of the inlet/outlet flange:
1. DN25-DN250 (same input and output diameters);
2. DN25XDN80 (100), DN40XDN100 (150), DN50XDN100 (150), DN65XDN150 (200), DN80XDN200 (250), DN100XDN250 (300), DN150XDN300, DN200XDN400 (output diameter is increased compared to input, which enables installation of noise suppressor in exit section);

Pressure classes and range of input and output pressures:
  1. PN 16/25; ANSI 150
  $P_{in\ max}$=25 bars
  $P_{out}$=0.02-12 bars
  2. ANSI 300/600
  $P_{in\ max}$=100 bars
  $P_{out}$=0.5-75 bars The gas pressure regulator, according to the present invention, has a lot of advantages over existing solutions. It can be used for horizontal and vertical installation, as well as for all other possible positions. Membrane assembly 21 is vertically arranged in relation to nozzle 02 and is not directly coupled to it. The set regulation force performs controlled movement of balanced nozzle 02 in a ratio of 1:1. This relationship can be changed by changing the transfer ratio of levers 14, 15, 16, which is important for finer regulation and is a significant advantage over existing solutions. The construction of the regulator is such that it facilitates easy servicing of membrane 22, inspection and control of critical elements of the membrane assembly and an overview of the lever mechanism without removing the regulator from the line. In case of damage to main sliding elements (gaskets 23, 24) pressure increases in carrier area 30, which pressure overcomes the force of spring 25 and suppresses axle 26 that signals (detects) the failure, as it can be coupled with a microswitch or some other signaling device 100. This regulator provides by its movable and fully balanced nozzle 02 high-quality regulation and easy closing, and with its output form it directs fluid flows, which provides higher flow characteristics than other manufacturers. In case of failure or damage to the membrane, the regulator remains closed.

The invention claimed is:

1. An indirectly-acting axial regulator of gas pressure, comprising:
   a first housing connected via a first impulse line to a pre-pilot regulator, the pre-pilot regulator connected to a pilot regulator, the pilot regulator connected by a second impulse line to an upper part of a second housing;
   wherein the second housing houses a membrane;
   wherein the first housing houses an axially-positioned balanced nozzle, the nozzle slidingly movably placed in sliding gaskets within the first housing;
   wherein the nozzle is pressed by a spring and an extension;
   wherein the first housing houses a seat with a gasket opposite to the nozzle;
   wherein the seat is squeezed between the first housing and an outlet flange;
   wherein the seat includes openings;
   wherein an upper side of the first housing is coupled to a carrier of the second housing;

wherein the second housing is composed of a lower part and the upper part;

wherein the membrane is squeezed between the lower part and the upper part of the second housing;

wherein a first plate is positioned on an upper side of the membrane and a second plate is positioned on a lower side of the membrane;

wherein the first and second plates are connected in a central part by a tightener and a support;

wherein a fixed piston with a choking channel is located at a center axis of the tightener and the support;

wherein a lower end of the piston is slidingly movably located, by a first guide and a first set of gaskets, in a lower part of the second housing, and an upper end of the piston is slidingly movably located, by a second guide and a second set of gaskets, in an upper part of the second housing, so that a lower portion of the piston contacts a roller;

wherein the roller is rotatably coupled by a first axle to a first end of a first lever;

wherein a second end of the first lever opposite to the first end is articulately connected to a support and a middle portion of the first lever is articulately connected to a top end of a second lever;

wherein a lower end of the second lever opposite to the top end is articulately connected to a third lever;

wherein the third lever is movably coupled to a lower part of the carrier by a second axle; and wherein the third lever includes archly bended legs that are movably coupled to the nozzle via plates.

2. The regulator according to claim 1, wherein the choking channel is connected by a first opening to a space above the membrane, and by a second opening to a space below the membrane.

3. The regulator according to claim 1, wherein:

the carrier includes a third, slidingly movable axle located on a side of the carrier facing toward an inlet flange of the first housing;

a first end of the third axle is engaged with a spring such that the third axle is biased in a direction away from the inlet flange of the first housing;

a second end of the third axle opposite to the first end of the third axle is secured by a safety device; and the third axle is coupled to a microswitch or other signaling device.

\* \* \* \* \*